March 5, 1929.     A. ESSEX     1,704,468
POWER LIFT PLOW
Filed July 31, 1925
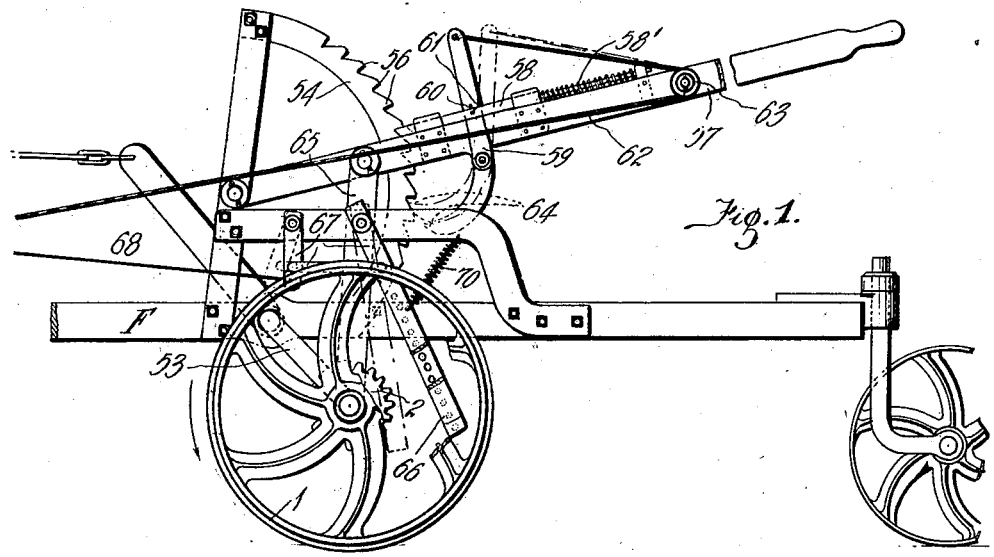
Fig. 1.
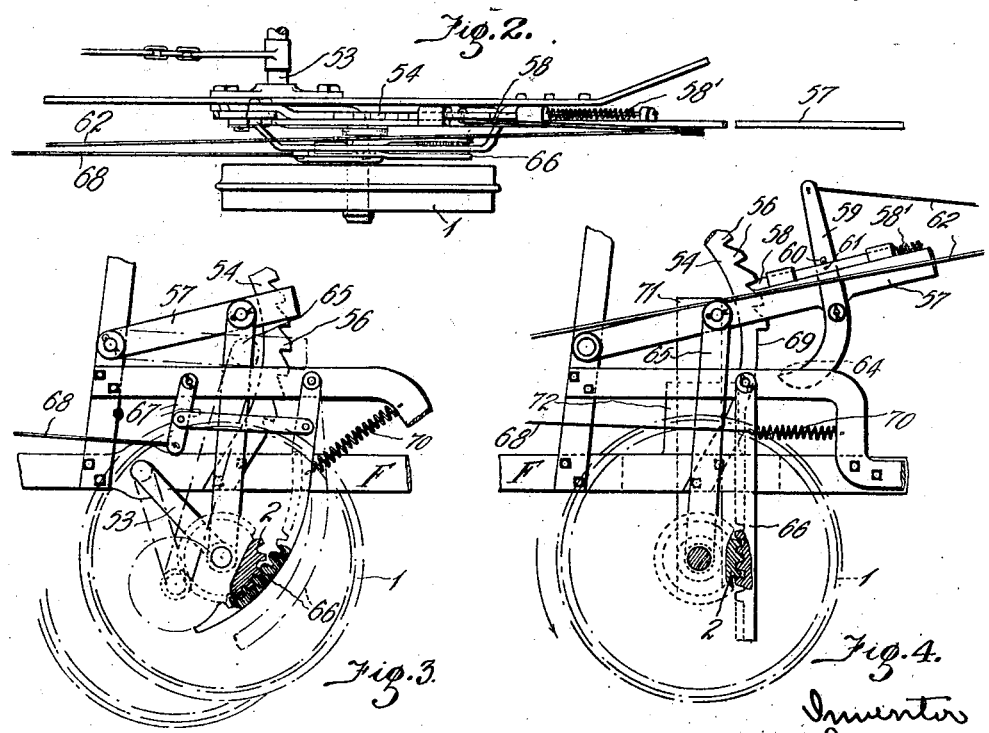
Fig. 2.
Fig. 3.
Fig. 4.
Inventor
A. Essex
By Marks & Clerk
attys Patented Mar. 5, 1929.

1,704,468

UNITED STATES PATENT OFFICE.

ALBERT ESSEX, OF FOOTSCRAY, VICTORIA, AUSTRALIA, ASSIGNOR TO MITCHELL & COMPANY PROPRIETARY LIMITED, OF FOOTSCRAY WEST, VICTORIA, AUSTRALIA.

POWER-LIFT PLOW.

Application filed July 31, 1925, Serial No. 47,357, and in Australia August 9, 1924.

This invention relates to improvements in and connected with means for raising and lowering agricultural implements and the like and refers especially to power lifting mechanism for plows, cultivators and other agricultural implements or machines, adapted to be controlled from a tractor through the medium of one or more flexible connections whereby the depth of cut of the cultivating shares or tines may be adjusted to suit requirements.

The object of the present invention is to provide simple and easily controlled means for use in conjunction with draught controlled raising devices whereby the depth of cut of the tilling members of a plow or the height of an implement frame relative to its ground wheels can be varied by the operators while the same is in motion.

I accomplish the above mentioned object by providing in combination with means for raising the frame of the implement in relation to the ground wheels by the tractive power such as by causing a toothed member on the frame to engage by the manipulation of a flexible pull member a pinion on the hub of a ground wheel, of rack and pawl mechanism operatively controlled by a flexible pull member and lever whereby the implement frame can be intermittently lowered with respect to the ground wheels one tooth at a time of the said rack mechanism.

In order that the invention may be readily understood reference will now be had to the accompanying sheets of explanatory drawings wherein—

Figure 1 is a view in side elevation showing an embodiment of the invention.

Figure 2 is a view in plan of Figure 1.

Figures 3 and 4 are views in side elevation showing slight modifications of the invention, which hereinafter are fully described.

In adapting the invention to a plow or like implement having a cranked axle 53 for carrying one or more wheels of the implement a quadrant 54 is rigidly carried on the frame and this quadrant is disposed adjacent to and in a plane parallel with a land wheel 1 freely mounted on the cranked axle.

The quadrant is provided with ratchet teeth 56 each having a radial face on its lower side and a bevelled face on the upper side. A suitable hand lever 57 is pivoted to the frame at the centre of the quadrant 54 and the same is provided with a slidable pawl 58 mounted in suitable guides thereon and adapted to engage the teeth of the quadrant, the said pawl 58 having a spring 58' associated therewith in order to keep the same normally in contact with the said teeth.

A bell crank lever 59 is pivoted to the said hand lever and a slot 60 is formed in one arm thereof and is adapted to engage a pin 61 rigidly attached to the above mentioned pawl 58. A cord 62 or like flexible member is connected to the upper end of the lever 59 and after passing around a pulley 63 on the lever 57 the flexible member passes and is secured at a point within convenient reach of the driver of the tractor.

The lower end 64 of the bell crank lever 59 is normally disposed clear of the teeth on the quadrant 54, but upon a tension being applied to the said flexible member 62 the said bell crank lever moves slightly about its pivot, thus withdrawing the pawl 58 from engagement with the quadrant against the action of the spring 58' and at the same time causing the lower end of the bell crank lever to engage the teeth thereon. It will be seen, therefore, that the pawl 58 and the engaging end 64 of the bell crank lever move simultaneously in opposite directions in such a manner that either one or the other is always in the path of the ratchet teeth.

A link 65 of adjustable length connects the hand lever 57 to the cranked axle 53 carrying the land wheel and constrains the same to move in unison therewith.

A depending rack 66 is pivotally mounted to a rigid portion of the frame and is normally disposed clear of the path of a pinion 2 rigidly mounted on the boss of the land wheel 1 and the same is provided with suitable linkwork 67 having a flexible member 68 passing therefrom to the tractor. The flexible member is arranged in such a manner that when a tension is applied thereto the rack 66 is caused to mesh with the pinion 2 carried on the land wheel.

In operation, to lower the frame of the implement the operator pulls the flexible member 68 attached to the longer arm of the bell crank lever 59 pivotally mounted on the hand lever, and the consequential movement of the same causes the pawl 58 to be withdrawn from the teeth of the quadrant 54 against the action of the spring 58' and at the same time places the engaging end of the bell crank lever into the path of the quadrant teeth. The pawl and the engaging end of the bell crank are so disposed that when the pawl is withdrawn from the radial face of one tooth, the engaging end of the bell crank is still a little below the radial face of the tooth adjacent thereto, so that the weight of the implement causes the frame and quadrant connected thereto to descend very slightly until the said tooth contacts with the end of the bell crank lever, it being understood that the link 65 connecting the cranked axle to the hand lever keeps the same at a substantially constant height above the ground.

Upon the flexible member 68 being released the spring 58' acting on the pawl 58 causes the same to be moved forward, and owing to the previously mentioned slight downward movement of the frame the same cannot re-engage the tooth on the quadrant from which it was withdrawn and therefore immediately the engaging end 64 is disengaged from the quadrant the weight of the frame causes a further downward movement until the radial face of the following tooth engages the said pawl. It will be clear that each successive complete movement of the bell crank 59 causes the frame to be lowered an amount depending on the pitch of the teeth of the said quadrant.

At the lower end of the quadrant 54 some of the teeth 56 may be cut away or, in other words, the quadrant at that part indicated at 69 in Figure 9 is made plain, so that the engaging end 64 of the bell crank may be permitted to slide past the same to the lowermost tooth of the quadrant after the pawl is released by the flexible connection. In this way, any predetermined depth may be given to the initial set of the plow or other implement, the maximum drop of the implement on this initial movement being governed by the distance between the pawl and the engaging end 64 of the bell crank.

In order to raise the frame the operator applies a tension to the flexible member 68 leading to the linkwork 67 associated with the depending rack 66 and causes the same to be moved until the teeth thereon mesh with the teeth on the pinion 2 carried on the hub of the landwheel 1. The rotation of the pinion 2 then causes the rack 66 and the frame to be moved upwardly in relation to the ground thus causing the cranked axle to make a partial rotation in the bearings for the same.

A suitable spring 70 or the like is provided to free the rack from engagement with the said pinion when the tension is romoved from the flexible member 68.

It will be understood that as the frame is being raised as above described the hand lever 57 moves simultaneously downwards by reason of the link 65 connecting the cranked axle thereto, the teeth on the quadrant and the lower side of the pawl being so shaped that the same will easily pass from one tooth to the teeth therebelow.

The depending rack 66 is preferably of straight formation but it may be curved in such a manner that the centre thereof is coincident with the centre of the cranked axle, see Figure 8 of the drawings.

In a modification of the invention instead of carrying the land wheel on a cranked axle, I may support the same on a post 71 freely slidable in vertical guides 72 carried on the implement frame, a link as 65 being utilized to connect the axle or the bearing thereof to the above-mentioned hand-lever 57 as in the constructions previously described.

It will be understood also that the operations of raising and lowering the implement can be performed manually by the direct manipulation of the above mentioned hand lever 57.

One of these devices may be applied to one or more of the land and furrow wheels of an implement, in order that the portions of the frame connected thereto may be raised and lowered independently or alternatively the said wheels may be so connected that the different parts of the frame may be simultaneously operated from the one device.

A power lift for agricultural implements constructed and arranged as set forth herein will be found effective in operation, simple in construction and low in manufacturing costs.

I claim—

1. In power raising and lowering mechanism for implements a main frame, a wheel mounted on the frame, a quadrant rack fitted to the frame of the implement, a hand lever pivoted to the centre of the quadrant, a link connecting the hand lever to the axle of the wheel, a spring actuated pawl slidably mounted on the hand lever and adapted to engage the quadrant rack, a bell crank pivoted to the hand lever having a curved lower end adapted to engage the teeth of the quadrant rack, a movable connection between the bell crank lever and the pawl, and a flexible operating member connected to the bell crank lever.

2. In an implement of the class described, a frame, a transport wheel, a member carrying said wheel and adjustably supporting said frame, a gear wheel on the transport wheel, a rack pivoted to the frame and adapted to be moved into engagement with said gear wheel to cause the frame to be raised, a raising and lowering lever, a link connection between the raising and lowering lever and the said member carrying the transport wheel, a toothed quadrant rack arranged concentrically with the pivot point of the lever, ratchet teeth on the quadrant rack, oppositely operated pawls supported by the lever and adapted to retain the frame in adjusted position, and a flexible pull member for operating the pawls alternately to intermittently lower the frame one tooth at a time of the rack.

3. In power raising and lowering means, a frame, a quadrant on the frame, ratchet teeth on the quadrant, a hand controlled raising and lowering lever pivoted to the centre of the quadrant, oppositely operated members on the lever for engaging the teeth of the quadrant, said teeth and members being shaped to permit of the free rotation of the lever in one direction to raise the frame, and manually controlled means for actuating the oppositely operated members to permit the lever to intermittently rotate in the opposite direction under the force of gravity.

4. Power raising and lowering mechanism including a frame, a quadrant rack on the frame, ratchet teeth on the quadrant rack, a raising and lowering lever pivotally supported at the centre of the quadrant rack whereby the raising and lowering lever will be free to rotate in one direction, a spring actuated pawl mounted on the said lever and engaging the teeth of the quadrant rack, a manually controlled lever pivoted to the raising and lowering lever and having its lower end shaped to engage the teeth of the quadrant rack, a pivotal connection between the manually controlled lever and the spring actuated pawl, and a flexible pulling cord attached to the manually controlled lever for actuating the said lever and pawl whereby the raising and lowering lever can be intermittently rotated in the opposite direction under the force of gravity.

ALBERT ESSEX.